(12) United States Patent
Brown et al.

(10) Patent No.: US 11,167,320 B2
(45) Date of Patent: Nov. 9, 2021

(54) CLEANING NOZZLES AND METHODS FOR OPTICAL FIBER CONNECTORS OR ADAPTERS

(71) Applicant: Corning Incorporated, Corning, NY (US)

(72) Inventors: James Michael Brown, Elmira, NY (US); Keith Mitchell Hill, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/547,797

(22) Filed: Aug. 22, 2019

(65) Prior Publication Data

US 2020/0070211 A1    Mar. 5, 2020

Related U.S. Application Data

(60) Provisional application No. 62/724,584, filed on Aug. 29, 2018, provisional application No. 62/742,582, filed on Oct. 8, 2018.

(51) Int. Cl.
| | |
|---|---|
| *B08B 1/00* | (2006.01) |
| *G02B 6/44* | (2006.01) |
| *G02B 6/36* | (2006.01) |
| *B08B 3/04* | (2006.01) |

(52) U.S. Cl.
CPC .............. *B08B 1/001* (2013.01); *B08B 3/04* (2013.01); *G02B 6/36* (2013.01); *G02B 6/4401* (2013.01); *B08B 2240/02* (2013.01)

(58) Field of Classification Search
CPC ....... B08B 1/001; B08B 3/04; B08B 2204/02; G02B 6/36; G02B 6/4401

USPC ........................................................ 385/100
See application file for complete search history.

(56) References Cited

U.S. PATENT DOCUMENTS

| | | | |
|---|---|---|---|
| 6,821,025 B2 | 11/2004 | Gerhard | |
| 7,032,841 B1 * | 4/2006 | Swisher | ................ B05B 9/0861 239/375 |
| 9,891,389 B1 * | 2/2018 | Fredell | ...................... B08B 3/04 |

(Continued)

FOREIGN PATENT DOCUMENTS

| | | | | |
|---|---|---|---|---|
| JP | 2009154161 A | * | 7/2009 | ............... B08B 3/02 |
| JP | 2009154161 A | | 7/2009 | |

OTHER PUBLICATIONS

Asseltrelay; "Westover FCLT-LC Cleaning Tip"; (2019) 3 Pages.

(Continued)

*Primary Examiner* — Jerry M Blevins
(74) *Attorney, Agent, or Firm* — Kapil U. Banakar

(57) ABSTRACT

A cleaning nozzle includes an inner nozzle housing having a feed passage for carrying cleaning fluid, a plurality of nozzle tips that each define a discharge opening in fluid communication with the feed passage, and an outer nozzle housing received over the inner nozzle housing. The outer nozzle housing includes a plurality of outer nozzle extensions that each extend over one of the nozzle tips. The outer nozzle extensions can be inserted into ports of an adapter, and flow of the cleaning fluid through the nozzle is split between the nozzle tips so that multiple optical connectors that populate the adapter can be cleaned simultaneously in a substantially uniform manner.

17 Claims, 6 Drawing Sheets

(56) References Cited

U.S. PATENT DOCUMENTS

| | | | |
|---|---|---|---|
| 2003/0111094 A1* | 6/2003 | Clatanoff | B05B 1/28 |
| | | | 134/6 |
| 2003/0221706 A1* | 12/2003 | Kiani | B08B 3/02 |
| | | | 134/6 |
| 2008/0281261 A1* | 11/2008 | Steinway | A61M 5/24 |
| | | | 604/68 |
| 2012/0204379 A1 | 8/2012 | Isenhour et al. | |

OTHER PUBLICATIONS

Duffy et al; "Development of an Automated Cleaning System for Multi-Ferrule Fiber Optic Connectors," OFC/NFOEC 2008—2008 pp. 1-5.
Viavi Cleanblast Universal 1.25mm Bulkhead Tip "; (Downloaded Oct. 21, 2019); 2 Pages".
International Search Report and Written Opinion of the European International Searching Authority; PCT/US2019/047440; dated Oct. 29, 2019; 14 Pgs.

* cited by examiner

CLEANING NOZZLES AND METHODS FOR OPTICAL FIBER CONNECTORS OR ADAPTERS

PRIORITY APPLICATION

This application claims the benefit of priority of U.S. Provisional Application No. 62/724,584, filed on Aug. 29, 2018, and U.S. Provisional Application No. 62/742,582, filed on Oct. 8, 2018. The content of these applications is relied upon and incorporated herein by reference in its entirety.

FIELD

The present disclosure relates to optical fiber connectors, and in particular to cleaning nozzles and cleaning methods for optical fiber connectors or adapters.

BACKGROUND

Optical fiber connectors are used to optically couple at least two lengths of optical fibers. To this end, an optical fiber connector typically includes a ferrule that supports an end portion of at least one optical fiber. For single fiber connectors (i.e., those having a ferrule supporting a single optical fiber), the coupling to another connector is typically achieved using adapter. The two connectors are inserted into ports on opposite sides of the adapter, and their respective ferrules enter opposite sides of a sleeve that is within the adapter. The pair of opposed ports and the sleeve define a "channel" of the adapter. Ultimately the ferrules make physical contact within the adapter sleeve, which aligns the ferrules so that end faces of the associated optical fibers are also aligned and in physical contact (or at least in very close proximity). Such an arrangement allows light to travel from one optical fiber to the other.

Many hardware products for telecommunication networks incorporate optical fiber adapters. Some of these products also include optical fiber cable assemblies having optical fiber connectors engaged with (i.e., plugged into) the adapters. In other words, one side of the adapters may be "populated" with connectors that have been inserted into the adapters. Modules or cassettes are notable examples of such products. Modules and cassettes typically include a linear array of adapters on a first end of a housing body, and one or more adapters on a second end of the housing body. A cable assembly that is located inside a cavity of the housing body extends between the linear array of adapters at the front end and the one or more adapters at the second end. The cable assembly includes connectors inserted into openings of the adapters that face the cavity.

The connectors (and specifically their ferrules) that populate adapters in hardware products are intended to be ready for optical coupling with other connectors, which may be inserted into outward-facing openings of the adapters. Given that the optical coupling is based on physical contact between the ferrules of pairs of connectors, and given the very small sizes of the optical fiber end faces, it is important that the ends of the ferrules and optical fiber end faces are kept clean prior to optical coupling. Debris and other contaminants present on the ferrule or optical fiber end face can result in attenuation and, therefore, adversely affect the optical coupling.

Various cleaning tools and systems have been developed to clean optical fiber connectors. Some systems spray or otherwise deliver a jet of pressurized gas mixed with a solvent toward the end of the ferrule and the optical fiber end face. Such systems typically include a nozzle or housing that interfaces with the connector directly or indirectly (e.g., via fixtures). Some nozzles can extend into an opening of an adapter to direct the cleaning mixture toward a connector that has been inserted into an opposite opening of the adapter. The nozzles are designed to clean one connector at a time, which presents challenges for adapters that include multiple channels (e.g., duplex or ganged configuration). It not only takes longer to clean multiple connectors that occupy the adapters, but there is also the potential for cross-contamination. For example, cleaning through one of the adapter openings may displace contaminants from the associated adapter channel and cause them to migrate into the adjacent or adapter channel(s) (or adapter(s)), which may have already been cleaned.

SUMMARY

This disclosure provides embodiments of a nozzle for cleaning an optical fiber connector or adapter with a cleaning fluid. According to one embodiment, the nozzle comprises: an inner nozzle housing having a base portion and a head portion, a plurality of inner nozzle extensions extending from the head portion, a plurality of nozzle tips each associated with a respective one of the plurality of inner nozzle extensions, and an outer nozzle housing received over the inner nozzle housing. The base portion of the inner nozzle housing defines a feed passage for carrying the cleaning fluid to the head portion. Each inner nozzle extension of the plurality of inner nozzle extensions defines a respective discharge passage that communicates with the feed passage via the head portion such that the head portion is configured to distribute the cleaning fluid carried by the feed passage to the discharge passages. Each nozzle tip of the plurality of nozzle tips defines a respective discharge opening that communicates with the discharge passage of the associated inner nozzle extension. The outer nozzle housing includes a plurality of outer nozzle extensions that each extend over at least a portion of one of the plurality of nozzle tips. The nozzle also includes a return flow path at least partially defined between the head portion of the inner nozzle housing and the outer nozzle housing. The inner nozzle housing includes at least one return passage in the base portion, and the return flow path extends from a front end portion of the outer nozzle housing to the at least one return passage.

According to another embodiment, a nozzle comprises: (i) an inner nozzle housing having a central axis, a base portion, and a head portion, (ii) first and second inner nozzle extensions extending from the head portion, (iii) first and second nozzle tips respectively associated with the first and second inner nozzle extensions, and (iv) an outer nozzle housing received over the inner nozzle housing. The base portion of the inner nozzle housing defines a feed passage extending along the central axis for carrying the cleaning fluid to the head portion. The first and second inner nozzle extensions each defines a respective discharge passage that communicates with the feed passage via the head portion such that the head portion is configured to distribute the cleaning fluid carried by the feed passage to the discharge passages. Each of the first and second nozzle tips defines a respective discharge opening that communicates with the associated discharge passage. The head portion of the inner nozzle housing, the first and second inner nozzle extensions, and the plurality of nozzle tips are shaped to define identical flow paths from the feed passage of the base portion to the discharge openings of the first and second nozzle tips. The outer nozzle housing includes first and second outer nozzle extensions through which the first and second nozzle tips at least partially extend. The nozzle also includes a return flow path defined between the head portion of the inner nozzle housing and the outer nozzle housing. The base portion of the inner nozzle housing includes at least one return passage, and wherein the return flow path extends from a front end portion of the outer nozzle housing to the at least one return passage.

According to yet another embodiment, a nozzle comprises: (i) an inner nozzle housing having a feed passage for carrying the cleaning fluid; a nozzle tip that defines a discharge opening in fluid communication with the feed passage of the inner nozzle housing; and (iii) an outer nozzle housing received over the inner nozzle housing. The outer nozzle housing includes an outer nozzle extension through which the nozzle tip at least partially extends. The nozzle also includes a return flow path defined between the inner nozzle housing and the outer nozzle housing. The return flow path extends from a front end portion of the outer nozzle housing to at least one return passage in the inner nozzle housing. Additionally, the outer nozzle housing is movable relative to the inner nozzle housing between: a) a forward position in which the outer nozzle extension covers the discharge opening of the nozzle tip, and b) a retracted position in which the outer nozzle extension does not cover the discharge opening of the nozzle tip.

This disclosure also includes methods of cleaning an optical fiber adapter with a nozzle. The adapter may be populated with optical fiber connectors, but this is not required. In generally, the adapter includes first and second sides, a plurality of ports on each of the first and second sides, and a plurality of adapter sleeves respectively aligned with the plurality of ports. The nozzle comprises an outer nozzle housing having a plurality of outer nozzle extensions and a plurality of nozzle tips that are each at least partially covered by one of the plurality of outer nozzle extensions. According to one embodiment, a cleaning method comprises: (i) inserting the plurality of outer nozzle extensions into the plurality of ports on the first side of the adapter; and (ii) directing a cleaning fluid through the nozzle and toward or into the plurality of adapter sleeves, wherein the cleaning fluid exits a plurality of discharge openings defined by the plurality of nozzle tips. The nozzle is configured to split flow of the cleaning fluid to the plurality of discharge openings in a substantially uniform manner.

Additional features and advantages will be set out in the detailed description that follows. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Because the disclosure relates to nozzles for cleaning optical fiber connectors ("connectors") and adapters, an example connector and adapter will first be described to put the disclosure in context. The connector and adapter that will be described are known as an LC-type connector and adapter, consistent with IEC standard 61754-20 (2012). Again, however, these components are merely examples to provide context for the cleaning nozzles of the disclosure, which may be applicable to other types of connectors and adapters.

Figure 1:
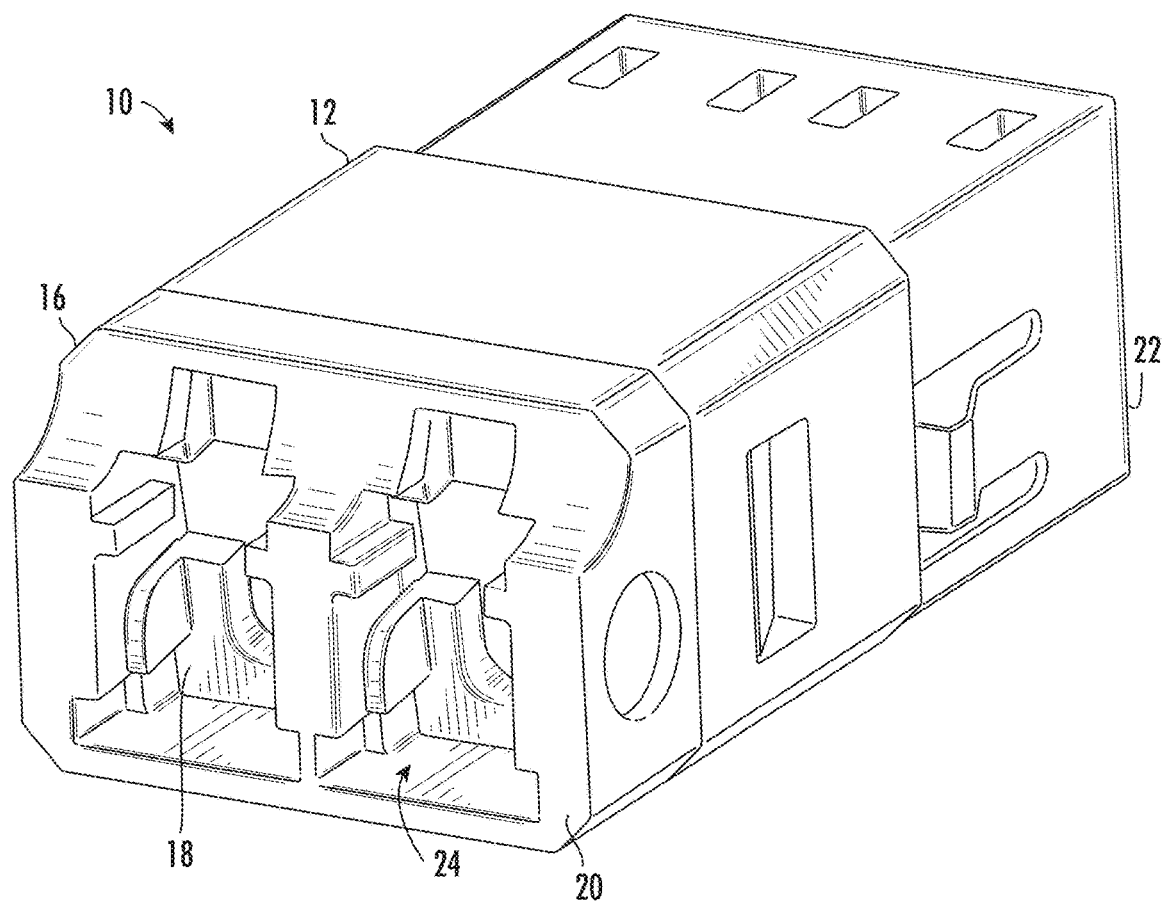
FIG. 1 is an isometric view of one example of an optical fiber adapter.
Figure 2:
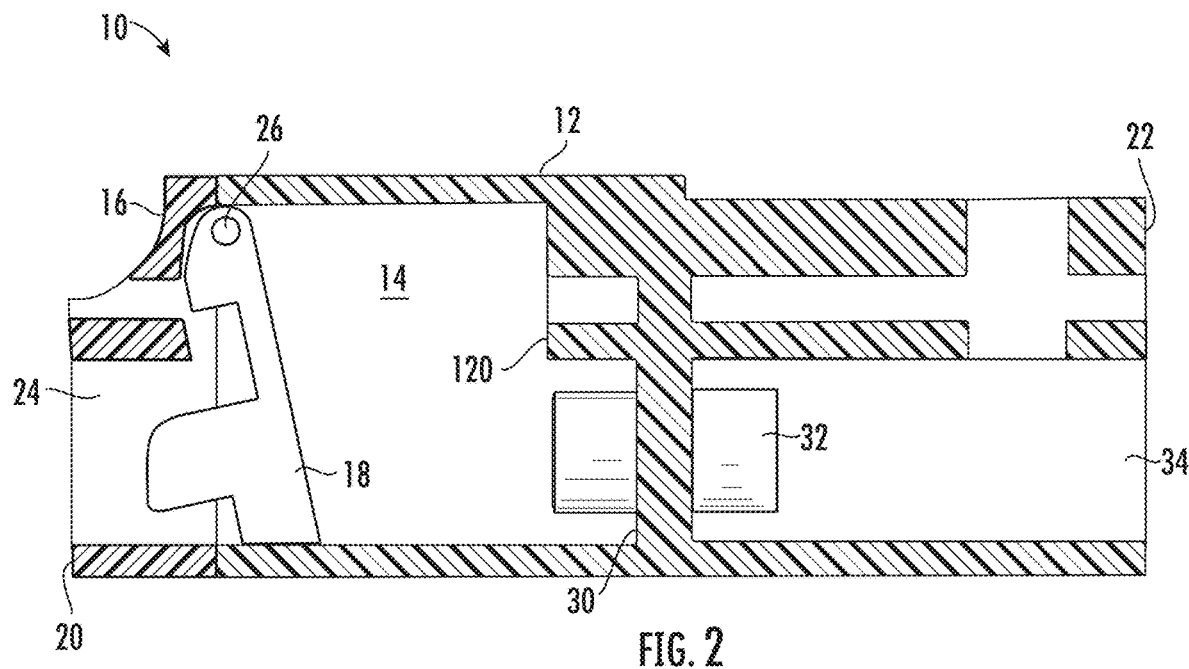
FIG. 2 is a cross-sectional view of the optical fiber adapter of FIG. 1.

To this end, FIGS. 1 and 2 illustrate one example of an adapter 10 that includes an adapter body 12 having a cavity 14, an adapter cap 16 secured to the adapter body 12, and a shutter door 18 positioned between the adapter cap 16 and the adapter body 12. The adapter body 12 is designed to be retained in a faceplate, panel, wall, bulkhead, or other structure (not shown) such that the adapter 10 can be considered to have a front side 20 (outward-facing) and back side 22 (inward-facing). The adapter cap 16 is located on the front side 20 and includes ports (i.e., openings) 24 into the cavity 14. The shutter door 18 blocks the ports 24, but can pivot about a hinge 26 into the cavity 14 to allow access to cavity 14 via the ports 24.

Inside the cavity 14, an internal wall 30 supports adapter sleeves 32 that are aligned with the ports 24 (one sleeve 32 for each port 24). The adapter sleeves 32 are also aligned with respective ports 34 defined by the body 12 on the back side 22 of the adapter 10. The ports 24, 34 on the front and back sides 20, 22 of the adapter 10 are designed to guide connectors into the cavity 14 so that ferrules of the connectors enter the adapter sleeves 32, which ultimately align the ferrules as they are brought into physical contact to establish an optical connection between optical fibers carried by the ferrules. In this regard, each pair of aligned ports 24, 34 and associated adapter sleeve 32 define a channel of the adapter 10.

Figure 3:
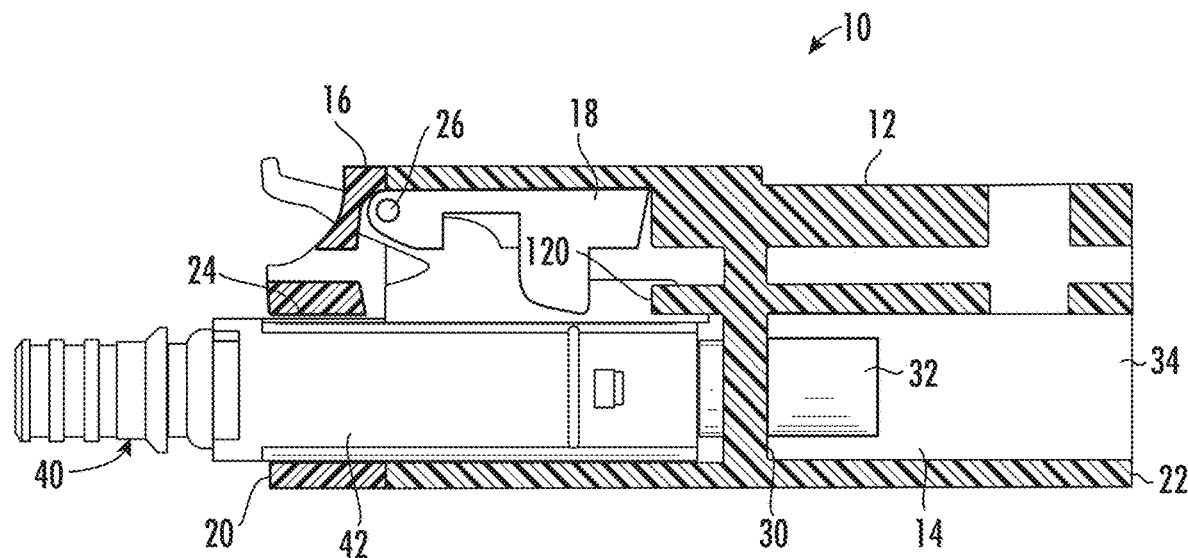
FIG. 3 is a cross-sectional view similar to FIG. 2, but illustrates one example of an optical fiber connector inserted into one side of the optical fiber adapter.

FIG. 3 illustrates one example of a connector 40 inserted into one of the ports 24 on the front side 20 of the adapter 10. The connector 40 includes a connector body 42 that pushes the shutter door 18 inward upon insertion, and the connector body 42 includes latching features or the like for mechanically retaining the connector 40 in the adapter 10. When the connector 40 is fully inserted as shown in FIG. 3, a ferrule (not shown) that extends beyond the connector body 42 enters the corresponding adapter sleeve 32.

In adapters that are components of other hardware products, the ports on the back side of the adapter may be populated with connectors in a factory setting, leaving the ports on the front side of the adapters unpopulated and ready to receive connectors in the field. This is effectively the opposite of what is shown in FIG. 3. Regardless of whether the ports that are populated with connectors are located on the front or back side of an adapter, it may be necessary to clean the connectors through adapters (i.e., direct cleaning fluid through the unpopulated ports toward the connectors). Indeed, in some instances it may even be desirable to clean the cavity 14 of the adapter body 12 without there being any connectors present.

Figure 4:
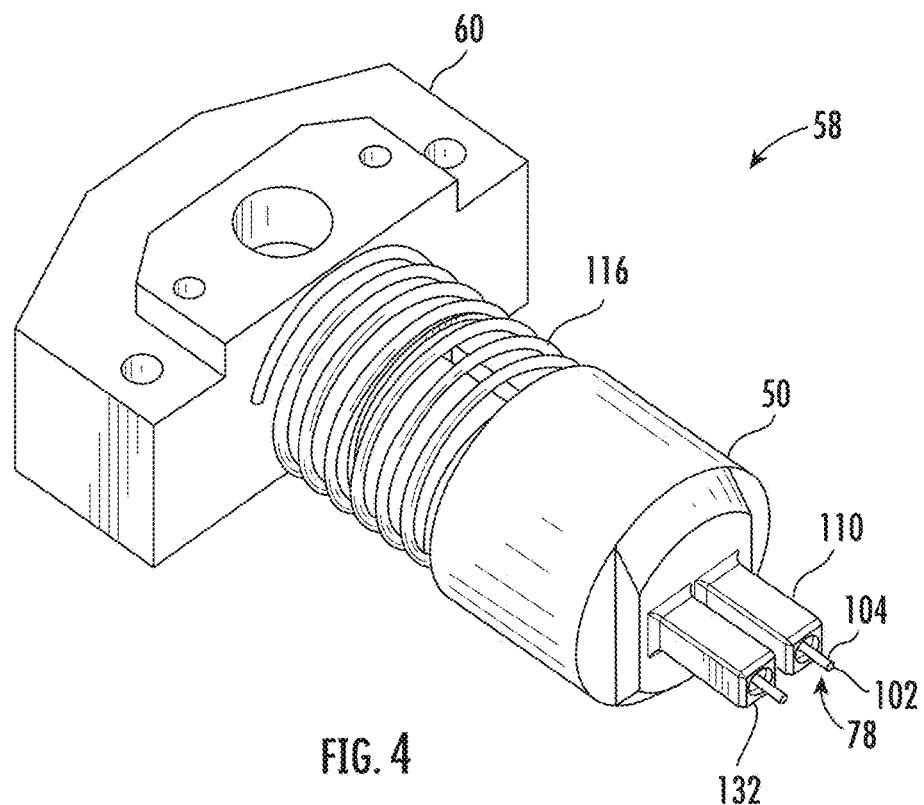
FIG. 4 is an isometric view of a nozzle assembly according to one embodiment of this disclosure for cleaning an optical fiber connector or adapter.
Figure 5:
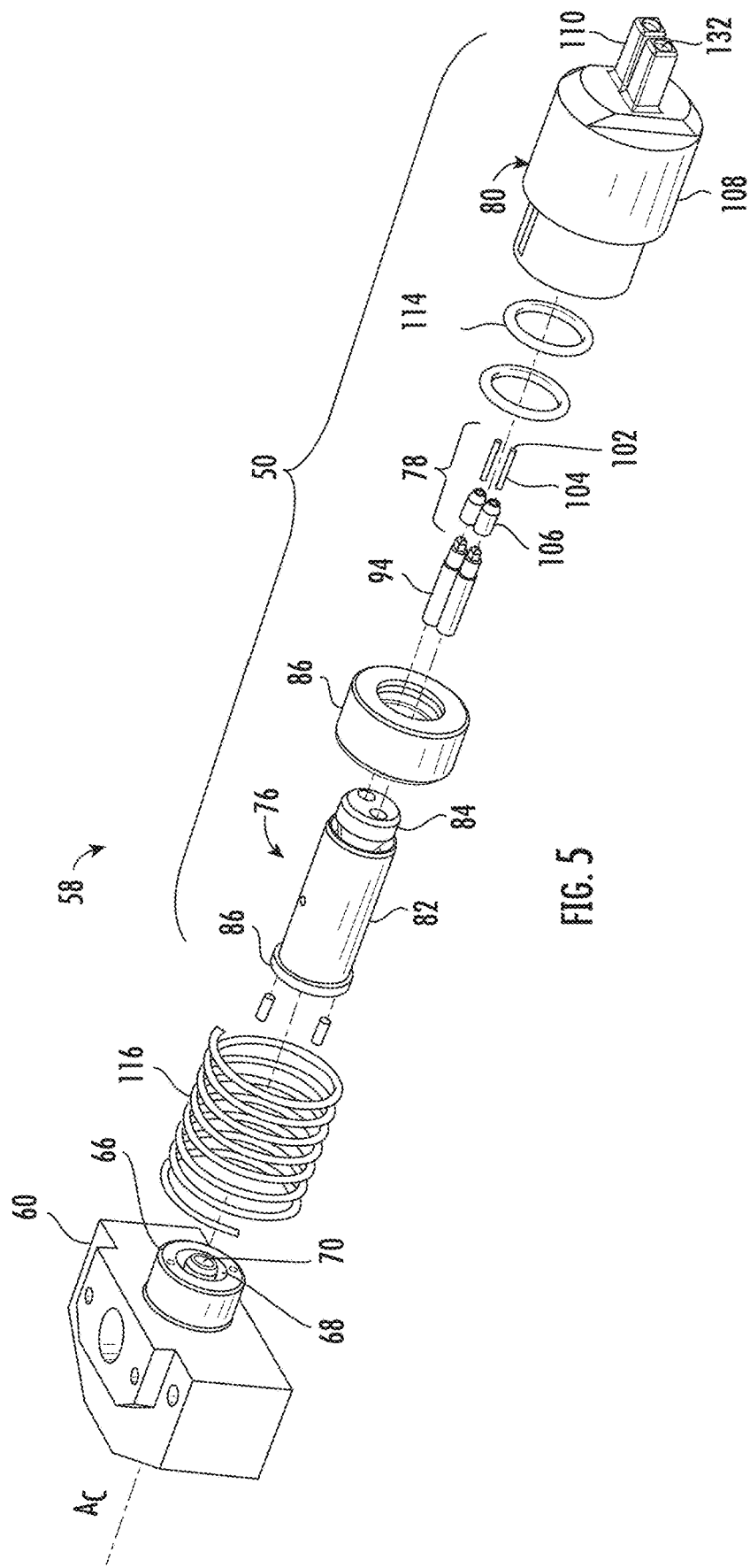
FIG. 5 is an exploded isometric view of the nozzle assembly of FIG. 4.

To this end, FIGS. 4 and 5 illustrate one example of a nozzle 50 for cleaning an optical fiber connector or adapter, such as the connector 40 or adapter 10. Indeed, FIGS. 6 and 7 further illustrate the nozzle 50 engaged with an adapter 52 similar to the adapter 10 (FIG. 1) prior to cleaning a connector 54 that has been inserted into the back side 22 of the adapter 52. The connector 54 includes a ferrule 56 extending into one of the adapter sleeves 32. Although only one connector 54 is shown, it will be appreciated that another connector may be present in the adjacent space of the cavity 14 such that both ports 34 are populated on the back side 22 of the adapter 52.

Referring collectively to FIGS. 4-7, the nozzle 50 is part of a nozzle assembly 58 that also includes a manifold 60 to which the nozzle 50 is coupled. The manifold 60 includes a supply passage 62 for delivering a cleaning fluid to the nozzle 50, and one or more removal passages 64 adjacent the supply passage 62. In the embodiment shown, the manifold 60 includes a front end 66 with an annular channel 68 around an exit opening 70 of the supply passage 62. Two removal passages 64 communicate with the annular channel 68. The manifold 60 may be connected to a delivery system (not shown) that supplies the cleaning fluid to the supply passage 62 and collects the cleaning fluid from the removal passages 64. The delivery system, for example, may include a source of pressurized gas that is mixed with a solvent for delivering the cleaning fluid, and a vacuum source that provides negative pressure to the removal passages 64 for collecting the cleaning fluid. Such delivery systems are well known and need not be described in further detail.

The nozzle 50 includes an inner nozzle housing 76 coupled to the manifold 60, a plurality of nozzle tips 78, and an outer nozzle housing 80 received over both the inner nozzle housing 76 and the nozzle tips 78. More specifically, and with additional reference to FIGS. 10 and 11, the inner nozzle housing 76 generally extends along a central axis $A_C$ and includes a base portion 82 and a head portion 84. The base portion 82 includes a rear flange 86 that allows a collar 88 or other coupling element to couple the inner nozzle housing 76 to the front end 66 of the manifold 60. The base portion 82 also defines a feed passage 90 for carrying cleaning fluid from the manifold 60 to the head portion 84, which includes multiple distribution passages 92. Thus, the head portion 84 is configured to distribute flow of the cleaning fluid from the feed passage 90 to the distribution passages 92. Inner nozzle extensions 94 that are coupled to the head portion 84 define respective discharge passages 96. The discharge passages 96 communicate with the feed passage 90 of the base portion 82 via the distribution passages 92 of the head portion 84.

In the embodiment shown, the inner nozzle extensions 94 are separate components coupled to the inner nozzle housing 76 (e.g., using a press-fit, adhesive, or other mechanical forms of coupling). In alternative embodiments, the inner nozzle extensions 94 and the inner nozzle housing 76 may be integrally formed as a monolithic structure.

Figure 10:
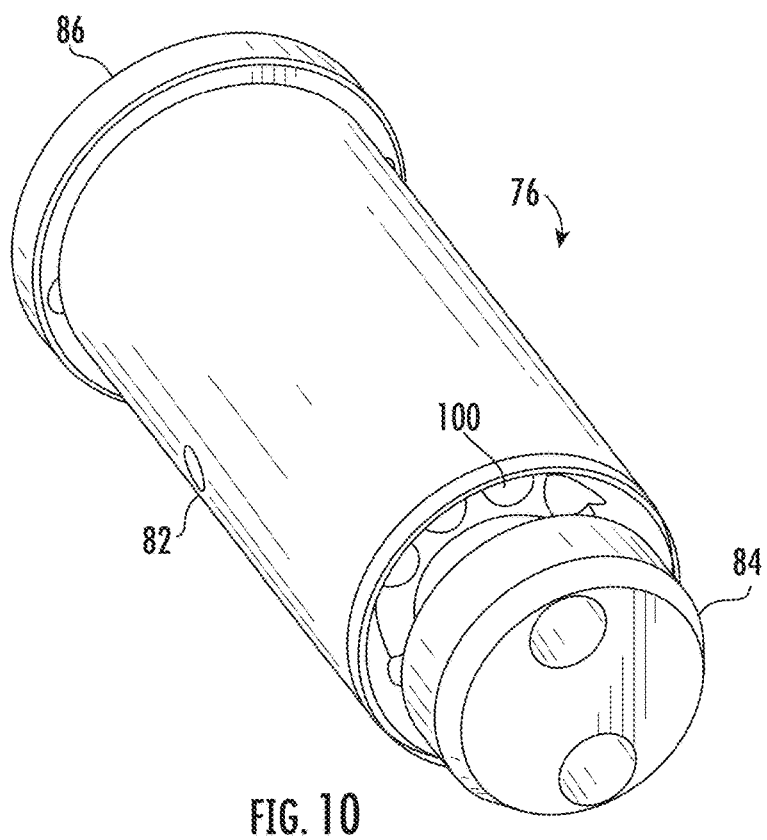
FIG. 10 is an isometric view of an inner nozzle housing of the nozzle in the nozzle assembly of FIG. 4, wherein the orientation of the inner nozzle housing is different in FIG. 10 to facilitate viewing and discussing features of the inner nozzle housing.
Figure 11:
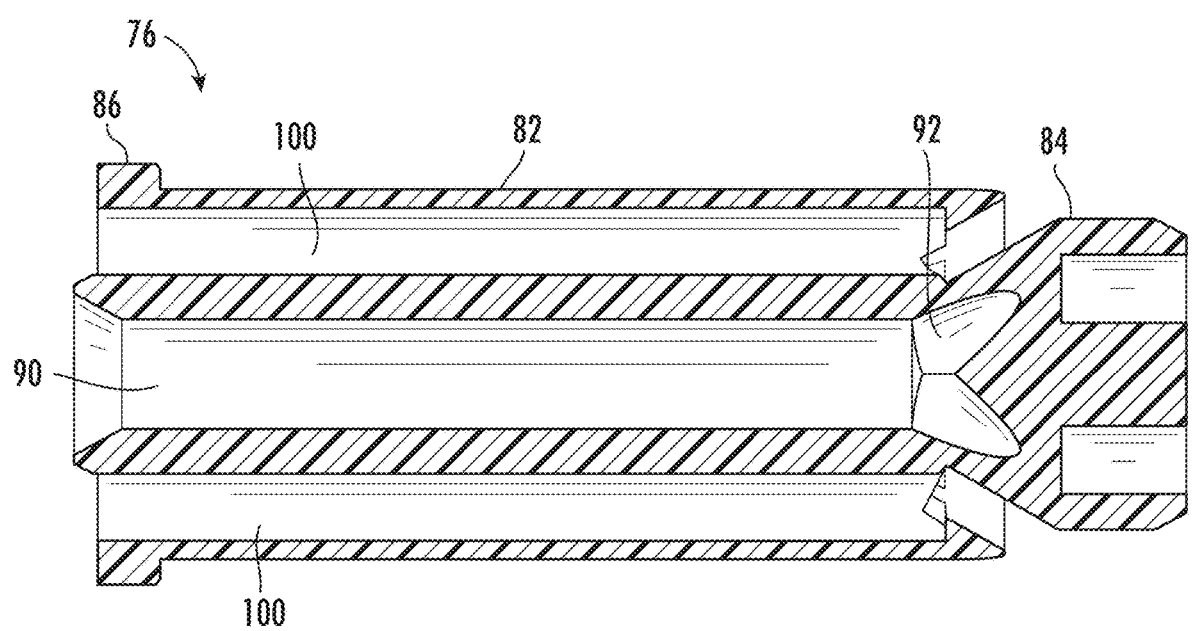
FIG. 11 is a schematic cross-sectional view of the inner nozzle housing shown in FIG. 10.

The inner nozzle housing 76 also includes at least one return passage 100, as best seen in FIGS. 10 and 11. Multiple return passages 100 are present in the embodiment shown. The return passages 100 are arranged about the feed passage 90 within the base portion 82 and symmetrically arranged about the central axis $A_C$. The feed passage 90, distribution passages 92, and discharge passages 96 are likewise designed to be symmetrical about the central axis $A_C$. Such an arrangement helps balance the flow of cleaning fluid through the nozzle 50 during a cleaning operation, as will become more apparent based on the description below.

Referring back to FIGS. 4-7, the nozzle tips 78 are each associated with a respective one of the inner nozzle extensions 94. In the embodiment shown, there are two inner nozzle extensions 94 (i.e., first and second inner nozzle extensions) and two nozzle tips 78 (i.e., first and second nozzle tips). Embodiments are also possible with more than two inner nozzle extensions 94 and a corresponding number of nozzle tips 78. This may desirable, for example, when using the nozzle 50 to clean adapters arranged in a linear array, such as in an optical fiber module or cassette, or adapters that have a ganged configuration (more than two ports per side).

Each nozzle tip 78 defines a respective discharge opening 102 that communicates with the discharge passage 96 of the associated inner nozzle extension 94. More specifically, each nozzle tip 78 includes a discharge tube 104 that defines the discharge opening 102 of the nozzle tip 78. Each nozzle tip 78 also includes a collar or collet 106 that securely holds the discharge tube 194. The collars 106 are removably coupled to the inner nozzle extensions 94, thereby allowing the discharge tubes 104 to be easily removed and replaced. This may be convenient due to the relatively small and fragile nature of the nozzle tips 78. Such an arrangement also reduces complexity compared to integrally forming the inner nozzle extensions 94 and the nozzle tips 78 as a monolithic structure. Readily available, lower-cost tubes, such as hypodermic syringe tubes, may be used as the discharge tubes 104. Nevertheless, monolithic embodiments of the inner nozzle extensions 94 and the nozzle tips 78 are not excluded from the scope of this disclosure. Thus, taking into account similar considerations mentioned above with respect to the inner nozzle housing 76 and the inner nozzle extensions 94, embodiments are contemplated where any two or all of the following are formed integrally as a monolithic structure: the inner nozzle housing 76, the inner nozzle extensions 94, and the nozzle tips 78.

Still referring to FIGS. 4-7, the outer nozzle housing 80 includes a main body portion 108 and a plurality of outer nozzle extensions 110 projecting from the main body portion 108. The main body portion 108 includes an internal cavity 112 that accommodates the inner nozzle housing 76. The outer nozzle extensions 110 extend over (and thereby accommodate) the inner nozzle extensions 94 and the nozzle tips 78. Thus, the outer nozzle housing 80 can be placed over the inner nozzle housing 76. In the embodiment shown, the main body portion 108 of the outer nozzle housing 80 is slidably mounted on the base portion 82 of the inner nozzle housing 76. O-rings 114 are positioned between the outer nozzle housing 80 and inner nozzle housing 76 at two, spaced-apart locations. The o-rings 114 provide a seal between the two components yet still allow the relative sliding movement.

Although a spring 116 is illustrated for biasing the outer nozzle housing 80 relative to the manifold 60, in some embodiments the position of the outer nozzle housing 80 may be fixed prior to operation. For example, after assembling the outer nozzle housing 80 over the inner nozzle housing 76, the outer nozzle housing 80 may be prevented from sliding or otherwise moving relative to the inner nozzle housing 76 (and the manifold 60 to which the inner nozzle housing 76 is coupled). This may be achieved by fixtures (not shown) or the like designed to support the outer nozzle housing 80 and potentially other components of the nozzle 50 and nozzle assembly 58. Thus, embodiments are contemplated without the spring 116.

Figure 6:
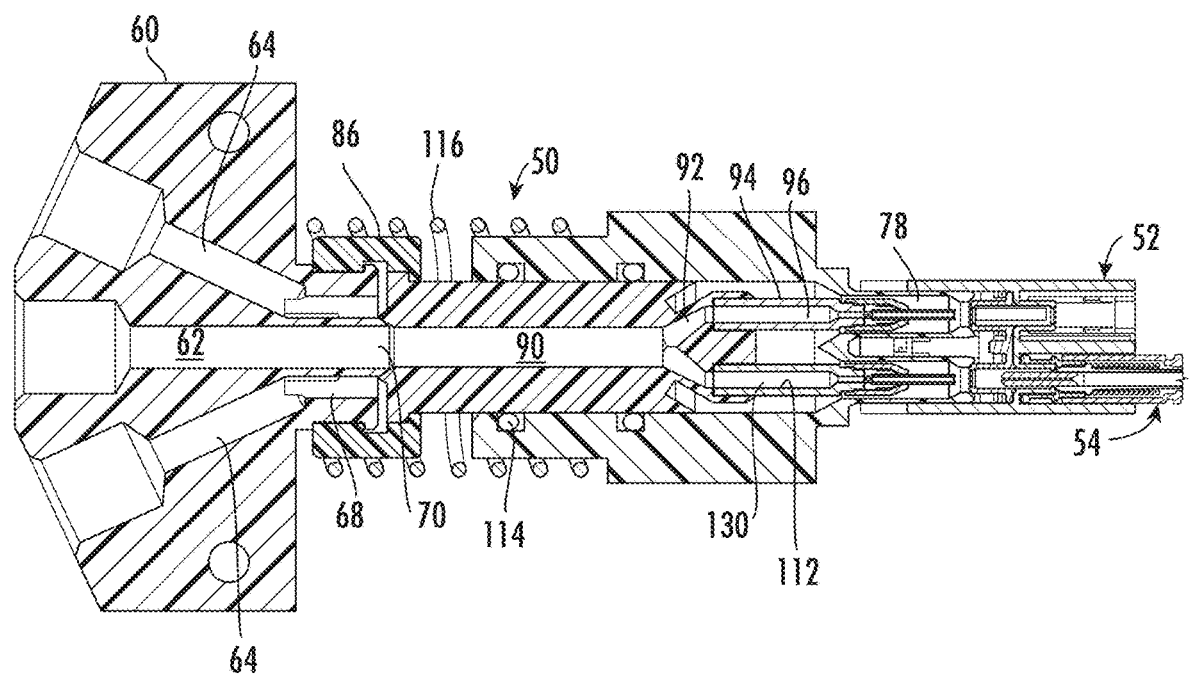
FIG. 6 is a schematic cross-sectional view of the nozzle assembly of FIG. 5 engaged with an adapter similar to the optical fiber adapter of FIG. 1, prior to cleaning an optical fiber connector that has been inserted into one side of the adapter.
Figure 7:
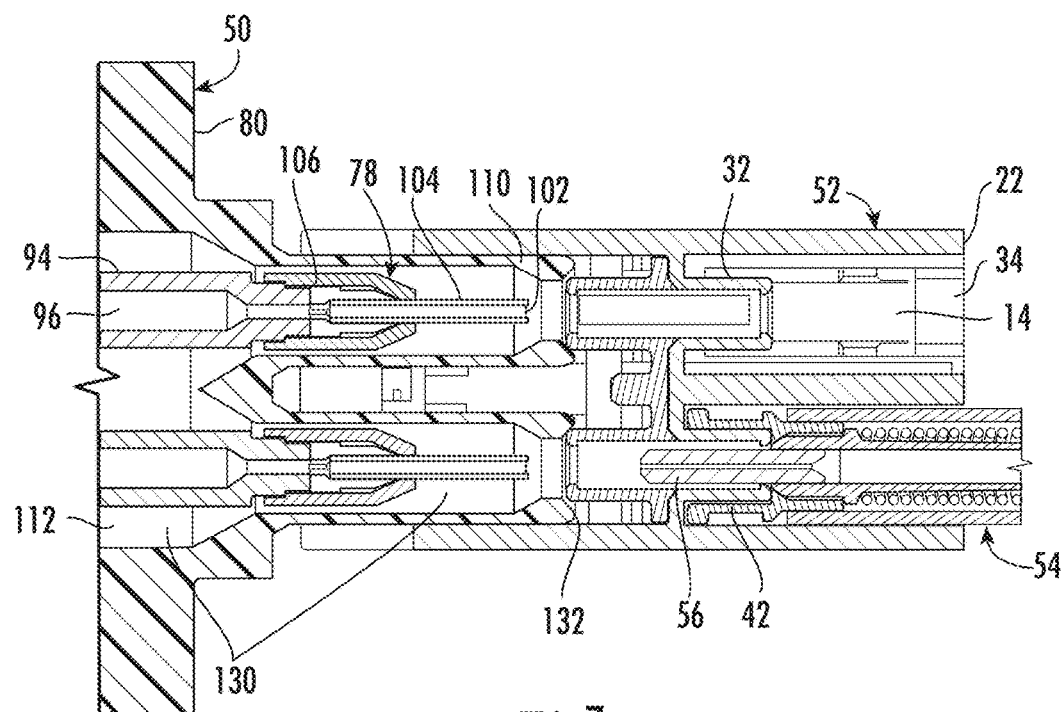
FIG. 7 is an enlarged view of a portion of FIG. 6, illustrating the engagement between a nozzle of the nozzle assembly and the adapter in further detail.

As best shown in FIGS. 4 and 5, the outer nozzle extensions 110 may be rectangular bodies extending from the main body portion 108. Indeed, the outer nozzle extensions 110 may be shaped to closely correspond to the shape/profile of the ports 24, 34 of the adapter 52. As best shown in FIGS. 6 and 7, the outer nozzle extensions 110 can be inserted into the cavity 14 of the adapter 52 until front ends 118 of the outer nozzle extensions 110 contact the adapter sleeves 32 and/or an internal boss 120 (see FIGS. 2 and 3) defined by the adapter body 12. The close-fitting nature between the outer nozzle extensions 110 and the ports 24, 34, and the hard stops provided by the adapter sleeves 32 and/or the internal boss 120, may help stabilize the outer nozzle housing 80 during operation.

FIGS. 6 and 7 illustrate the outer nozzle housing 80 in a forward position in which the outer nozzle extensions 110 cover the discharge openings 102 of the nozzle tips 78. In other words, the nozzle tips 78 are located completely within the outer nozzle extensions 110. Given that the adapter sleeves 32 and/or the internal boss 120 provide a hard stop for the outer nozzle extensions 110, and that the discharge openings 102 of the nozzle tips 78 are located within the outer nozzle extensions 110 in this forward position, the discharge openings 102 are necessarily spaced from the adapter sleeves 32. Cleaning may be performed with the outer nozzle housing 80 in this forward position. As mentioned above, the cleaning may be performed without any connectors present (e.g., with the objective of only cleaning the adapter sleeves 32 and surrounding structure), or with connectors present (e.g., with the objective of cleaning both the ferrules of the connectors and the adapter sleeves 32). Because the nozzle tips 78 do not extend into the adapter sleeves 32, embodiments are possible where the discharge openings 102 have a maximum width/diameter greater than an inner diameter of the adapter sleeves 32. For example, in alternative embodiments not shown, the discharge openings 102 may have a maximum width greater than 1.25 mm, or greater than 1.26 mm, whereas the adapter sleeves 32 have an inner diameter less than 1.25 mm, or less than 1.25 mm.

To perform a cleaning operation, the delivery system is controlled to supply cleaning fluid to the supply passage 62 of the manifold 60. The cleaning fluid may consist only of a gas (e.g., air) or only of a liquid (solvent), or may comprise a mixture of a gas and a liquid. Positive pressure applied to the cleaning fluid causes the cleaning fluid to travel through the supply passage 62 of the manifold 60 and into the feed passage 90 defined by the base portion 82 of the inner nozzle housing 76. The head portion 84 of the inner nozzle housing 76 distributes and directs the cleaning fluid to the discharge passages 96 of the inner nozzle extensions 94, after which the cleaning fluid enters the nozzle tips 78. Ultimately the cleaning fluid exits the discharge openings 102 of the nozzle tips 78 to contact the nearby structure (e.g., the adapter sleeves 32 and/or ferrules 56).

As the cleaning fluid flows across the nearby structures, contaminants are removed from the structures and mixed into the cleaning fluid. The mixture of contaminants and cleaning fluid then travels back through the nozzle assembly 58 to the delivery system for disposal, storage, or other processing. More specifically, space between each nozzle tip 78 and the associated outer nozzle extension 110 defines a portion of a return flow path 130 for the mixture. The return flow path 130 is also partially defined by space between the main body portion 108 of the outer nozzle housing 80 and the inner nozzle housing 76 (both the base portion 82 and the head portion 84). This latter space communicates with the return passages 100 (FIGS. 10 and 11) in the base portion 82 of the inner nozzle housing 76. Thus, the return flow path 130 extends from a front end portion 132 of the outer nozzle housing 80 to the return passages 100 of the inner nozzle housing 76. Negative pressure (i.e., a vacuum) applied to the removal passages 64 of the manifold 60 draws the mixture of cleaning fluid and removed contaminants through the return flow path 130 and into the removal passages 64. The delivery system then directs the mixture from the manifold 60 to a desired location.

The ability to simultaneously clean multiple adapter channels and/or connectors using the nozzle 50 may provide several advantages. For example, the overall time to clean a given number of components may be reduced. Indeed, the overall complexity of the cleaning process may be reduced by having one control that determines the flow of cleaning fluid to the plurality of discharge openings 102. And by cleaning adjacent adapter channels and/or connectors at the same time, there is less potential of the "cross-contamination" referred to in the Background section above.

The above advantages may be best realized when the nozzle 50 is configured or otherwise designed to split flow of the cleaning fluid to the plurality of discharge openings 102 in a substantially uniform manner. In this disclosure, splitting flow in a "substantially uniform manner" refers to the volume and flow rate of the cleaning fluid at each discharge opening 102 deviating by no more than 10% at a given time during a cleaning operation. The nozzle 50 is purposefully designed to evenly balance flow to the discharge openings 102, such that a skilled person would understand the intent for there to be identical flow paths to the discharge openings 102. In this regard, the head portion 84 of the inner nozzle housing 76, the plurality of inner nozzle extensions 94, and the plurality of nozzle tips 78 are shaped to define identical flow paths from the feed passage 90 of the base portion 82 to the discharge openings 102 of the plurality of nozzle tips 78. It was mentioned above how the feed passage 90, distribution passages 92, discharge passages 96, and return passages 100 are symmetrically arranged about the central axis $A_C$. The design intent for identical flow, as reflected by the shapes of components, remains intact even though flow may be slightly less than identical during operation due to the ability to control flow with certainty.

In addition to reducing or avoid cross-contamination during cleaning, the nozzle 50 may limit the leakage of cleaning fluid in general from the desired areas to be cleaned. For example, contact between the front end portion 132 of the outer nozzle housing 80 and the internal boss 120 may help prevent cleaning fluid from escaping the adapter channels being cleaned and, at the same time, help ensure that the cleaning fluid is directed to the return flow paths 130.

Figure 8:
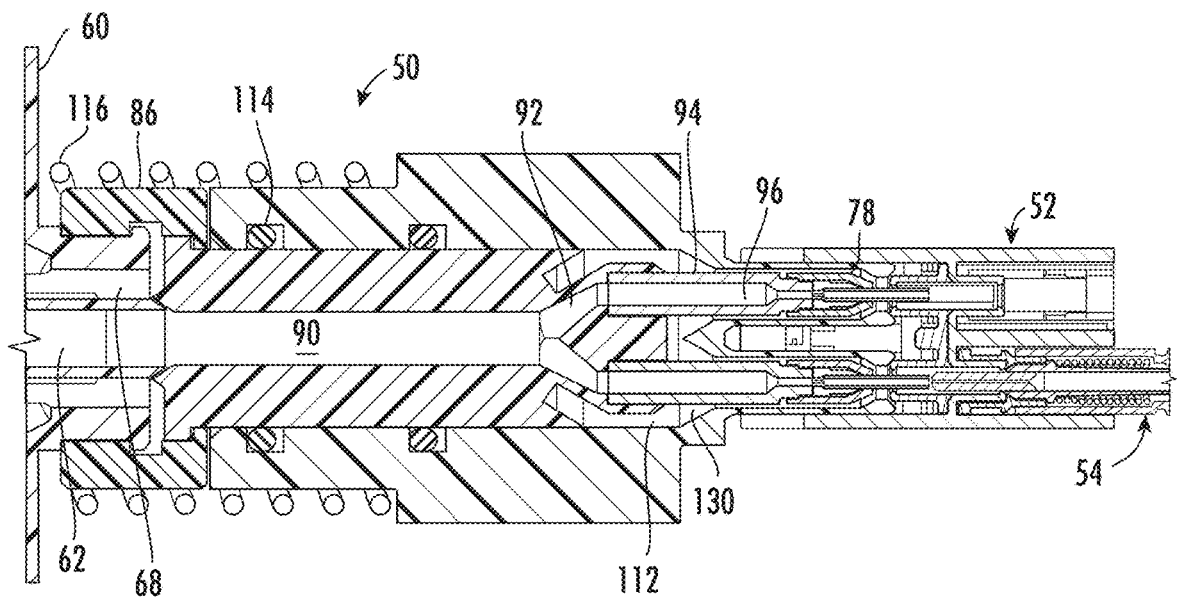
FIG. 8 is a schematic cross-sectional view similar to FIG. 6, but illustrates the nozzle of the nozzle assembly inserted further into the adapter so that a cleaning fluid can be discharged closer to the optical fiber connector.
Figure 9:
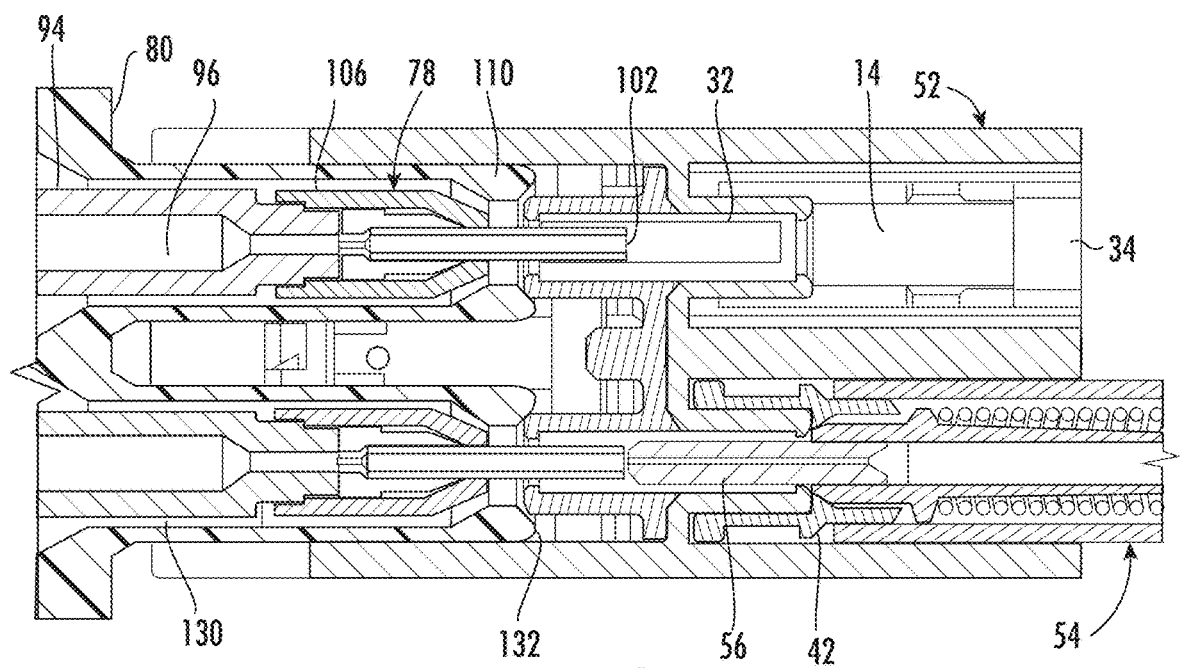
FIG. 9 is an enlarged view of a portion of FIG. 8, illustrating the position of the nozzle in the adapter and relative to the optical fiber connector in further detail.

It will be apparent to those skilled in the art that various modifications to the preferred embodiments of the disclosure as described herein can be made without departing from the spirit or scope of the disclosure as defined in the appended claims. For example, it was mentioned above that FIGS. 6 and 7 illustrate the outer nozzle housing 80 in a forward position. Cleaning may also be performed with the outer nozzle housing 80 in a retracted position where the discharge openings 102 are not covered by the outer nozzle extensions 110. In other words, the outer nozzle housing 80 may be moved relative to the inner nozzle housing 76 (and thus relative to the inner nozzle extensions 94 and the nozzle tips 78) from the forward position to the retracted position. Doing so causes the discharge tubes 104 to extend out of the outer nozzle extensions 110 so that the discharge openings 102 are exposed, as shown in FIGS. 8 and 9. Such an arrangement allows the discharge openings 102 to be located within the adapter sleeves 32 so that cleaning fluid is dispensed closer to the ferrules 56 of connectors 54 that have been inserted into the adapter 52.

Thus, the disclosure covers the modifications and variations provided they come within the scope of the claims that follow.

What is claimed is:

1. A nozzle for cleaning an optical fiber connector or adapter with a cleaning fluid, the nozzle comprising:
   an inner nozzle housing having a base portion and a head portion, wherein the base portion defines a feed passage for carrying the cleaning fluid to the head portion;
   a plurality of inner nozzle extensions extending from the head portion, wherein each inner nozzle extension of the plurality of inner nozzle extensions defines a respective discharge passage that communicates with the feed passage via the head portion, such that the head portion is configured to distribute the cleaning fluid carried by the feed passage to the discharge passages;
   a plurality of nozzle tips each associated with a respective one of the plurality of inner nozzle extensions, wherein each nozzle tip of the plurality of nozzle tips defines a respective discharge opening that communicates with the discharge passage of the associated inner nozzle extension;
   wherein each nozzle tip of the plurality of nozzle tips comprises:
   a discharge tube that defines the discharge opening of the nozzle tip; and
   a collar that securely holds the discharge tube, wherein the collar is removably coupled to the associated inner nozzle extension;
   an outer nozzle housing received over the inner nozzle housing, wherein the outer nozzle housing includes a plurality of outer nozzle extensions that each extend over at least a portion of one of the plurality of nozzle tips; and
   a return flow path at least partially defined between the head portion of the inner nozzle housing and the outer nozzle housing, wherein the inner nozzle housing includes at least one return passage in the base portion, and wherein the return flow path extends from a front end portion of the outer nozzle housing to the at least one return passage.

2. The nozzle of claim 1, wherein:
   the plurality of inner nozzle extensions comprises at least three inner nozzle extensions;
   the plurality of nozzle tips comprises at least three nozzle tips; and
   the plurality of outer nozzle extensions comprises at least three outer nozzle extensions.

3. The nozzle according to claim 1, wherein the head portion of the inner nozzle housing, the plurality of inner nozzle extensions, and the plurality of nozzle tips are shaped to define identical flow paths from the feed passage of the base portion to the discharge openings of the plurality of nozzle tips.

4. The nozzle according to claim 1, wherein each nozzle tip of the plurality of nozzle tips is coupled to the associated inner nozzle extension.

5. The nozzle according to claim 1, wherein the plurality of nozzle tips and the plurality of inner nozzle extensions are integrally formed as a monolithic structure such that the inner nozzle housing comprises the plurality of nozzle tips.

6. The nozzle according to claim 1, wherein each inner nozzle extension of the plurality of inner nozzle extensions is coupled to the head portion of the inner nozzle housing.

7. The nozzle according to claim 1, wherein the inner nozzle housing and the plurality of inner nozzle extensions are integrally formed as a monolithic structure such that the inner nozzle housing comprises the plurality of inner nozzle extensions.

8. The nozzle according to claim 1, wherein the outer nozzle housing is slidably mounted on the inner nozzle housing.

9. The nozzle according to claim 1, wherein the outer nozzle housing is movable relative to the inner nozzle housing between: a) a forward position in which the plurality of outer nozzle extensions cover the discharge openings of the plurality of nozzle tips, and b) a retracted position in which the plurality of outer nozzle extensions do not cover the discharge openings of the plurality of nozzle tips.

10. The nozzle according to claim 9, further comprising:
    at least one sealing element positioned between the outer nozzle housing and the base portion of the inner nozzle housing.

11. The nozzle according to claim 1, wherein the outer nozzle housing is spring-biased relative to the inner nozzle housing.

12. The nozzle according to claim 1, wherein each outer nozzle extension of the plurality of outer nozzle extensions comprises a substantially rectangular body.

13. A nozzle for cleaning an optical fiber connector or adapter with a cleaning fluid, the nozzle comprising:
    an inner nozzle housing having a central axis, a base portion, and a head portion, wherein the base portion defines a feed passage extending along the central axis for carrying the cleaning fluid to the head portion;

first and second inner nozzle extensions extending from the head portion, wherein the first and second inner nozzle extensions each defines a respective discharge passage that communicates with the feed passage via the head portion such that the head portion is configured to distribute the cleaning fluid carried by the feed passage to the discharge passages;

first and second nozzle tips respectively associated with the first and second inner nozzle extensions, wherein each of the first and second nozzle tips defines a respective discharge opening that communicates with the associated discharge passage, and wherein the head portion of the inner nozzle housing, the first and second inner nozzle extensions, and the plurality of nozzle tips are shaped to define identical flow paths from the feed passage of the base portion to the discharge openings of the first and second nozzle tips;

wherein each nozzle tip of the plurality of nozzle tips comprises:

a discharge tube that defines the discharge opening of the nozzle tip; and a collar that securely holds the discharge tube, wherein the collar is removably coupled to the associated inner nozzle extension;

an outer nozzle housing received over the inner nozzle housing, wherein the outer nozzle housing includes first and second outer nozzle extensions through which the first and second nozzle tips at least partially extend; and a return flow path defined between the head portion of the inner nozzle housing and the outer nozzle housing, wherein the base portion of the inner nozzle housing includes at least one return passage, and wherein the return flow path extends from a front end portion of the outer nozzle housing to the at least one return passage.

14. The nozzle according to claim 13, wherein the return flow path is symmetrical about the central axis.

15. The nozzle according to claim 14, wherein the at least one return passage comprises a plurality of return passages symmetrically arranged about the central axis.

16. A nozzle for cleaning an optical fiber connector or adapter with a cleaning fluid, the nozzle comprising:

an inner nozzle housing having a feed passage for carrying the cleaning fluid;

a nozzle tip that defines a discharge opening in fluid communication with the feed passage of the inner nozzle housing;

wherein the nozzle tip comprises:

a discharge tube that defines the discharge opening of the nozzle tip; and a collar that securely holds the discharge tube, wherein the collar is removably coupled to the associated inner nozzle extension;

an outer nozzle housing received over the inner nozzle housing, wherein the outer nozzle housing includes an outer nozzle extension through which the nozzle tip at least partially extends; and a return flow path defined between the inner nozzle housing and the outer nozzle housing, wherein the inner nozzle housing includes at least one return passage, and wherein the return flow path extends from a front end portion of the outer nozzle housing to the at least one return passage;

wherein the outer nozzle housing is movable relative to the inner nozzle housing between:

a) a forward position in which the outer nozzle extension covers the discharge opening of the nozzle tip, and b) a retracted position in which the outer nozzle extension does not cover the discharge opening of the nozzle tip.

17. The nozzle according to claim 16, wherein the outer nozzle housing is slidably mounted on the inner nozzle housing.

* * * * *

UNITED STATES PATENT AND TRADEMARK OFFICE
CERTIFICATE OF CORRECTION

PATENT NO. : 11,167,320 B2
APPLICATION NO. : 16/547797
DATED : November 9, 2021
INVENTOR(S) : James Michael Brown et al.

It is certified that error appears in the above-identified patent and that said Letters Patent is hereby corrected as shown below:

On the Title Page

In Column 2, item (56), Other Publications, Line 1, delete "Asseltrelay;" and insert -- AssetRelay; --, therefor.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*